United States Patent [19]

Altmanshofer

[11] Patent Number: 5,196,941
[45] Date of Patent: Mar. 23, 1993

[54] BEAM SCAN VELOCITY MODULATION APPARATUS

[75] Inventor: Robert D. Altmanshofer, Carmel, Ind.

[73] Assignee: RCA Licensing Corporation, Princeton, N.J.

[21] Appl. No.: 826,541

[22] Filed: Jan. 27, 1992

Related U.S. Application Data

[62] Division of Ser. No. 561,988, Aug. 2, 1990, Pat. No. 5,093,728.

[51] Int. Cl.⁵ .............................................. H04N 3/32
[52] U.S. Cl. ................................... 358/242; 358/184; 358/167; 315/387
[58] Field of Search ................. 358/242, 64, 184, 167; 315/403, 387, 389

[56] References Cited

U.S. PATENT DOCUMENTS

| | | | |
|---|---|---|---|
| 4,170,785 | 10/1979 | Yoshida et al. | 358/242 |
| 4,183,064 | 1/1980 | Sahara et al. | 358/242 |
| 4,185,301 | 1/1980 | Mitsuda et al. | 358/242 |
| 4,261,014 | 4/1981 | Lee | 358/166 |
| 4,309,725 | 1/1982 | Groeneweg | 358/242 |
| 4,314,184 | 2/1982 | Ryan | 315/403 |
| 4,639,785 | 1/1987 | Tallant et al. | 358/184 |
| 4,642,533 | 2/1987 | Carpenter | 315/403 |
| 4,994,756 | 7/1991 | Brilka | 358/184 |
| 5,072,300 | 12/1991 | Anderson | 358/242 |
| 5,093,728 | 3/1992 | Altmanshofer | 358/242 |

FOREIGN PATENT DOCUMENTS

| | | | |
|---|---|---|---|
| 0469566 | 2/1992 | European Pat. Off. | |
| 53-25314 | 3/1978 | Japan | |
| 53-49304 | 11/1978 | Japan | 358/184 |
| 61-71774 | 4/1986 | Japan | |
| 0249366 | 10/1990 | Japan | |

OTHER PUBLICATIONS

Schematic of SVM circuitry for Toshiba color television receiver model No. 30ID1, published in the magazine Gijutsu, Oct. 1988 p. 301.

Article from "Best of the Expander vol. II", entitled Scan Velocity Modulation—Making It Crisp Around The Edges!, 1988, pp. 74–79.

"TV-Video Schematic Diagrams," published 1990 by Dempa Shimbun, p. 387—National TH-29X1 and p. 389—National TH—37X1.

Primary Examiner—James J. Groody
Assistant Examiner—Jeffrey Murrell
Attorney, Agent, or Firm—Joseph S. Tripoli; Joseph J. Laks; Francis A. Davenport

[57] ABSTRACT

In beam scan velocity modulation (SVM) system for a television receiver, a video signal is applied to a differentiator followed by a limiting differential amplifier. A driver amplifier coupled to the limiting amplifier drives an output stage that supplies current to an SVM coil. Certain video signals with large high frequency content may tend to produce excessive dissipation in the devices of the output stage. To prevent this, a current source for the differential amplifier is controlled by a voltage which is a measure of the average current through the output stage. The magnitude of the current source is varied to thereby vary the peak-to-peak signal output from the limiting amplifier to prevent overdissipation of the output devices. The presence of random noise in the video signal can produce unwanted SVM operation which can impair the viewed image. The unwanted noise component in the video signal can be reduced in amplitude by coring. The coring is unaffected by the variable limiting.

24 Claims, 5 Drawing Sheets

BEAM SCAN VELOCITY MODULATION APPARATUS

CROSS REFERENCE TO RELATED APPLICATIONS

This application is a division of copending application Ser. No. 561,988 filed Aug. 2, 1990 and now U.S. Pat. No. 5,093,728.

BACKGROUND OF THE INVENTION

1. Field of the Invention

This invention relates generally to beam scan velocity modulation (SVM) systems employed for picture sharpness enhancement and more particularly to an output current limiting, apparatus employed in an SVM system.

2. Description of the Related Art

It is well known that an improvement in apparent picture resolution can be achieved by modulating the beam scan velocity in accordance with the derivative of the video signal which controls the beam intensity. This video signal is referred to as the luminance signal and the derivative of the luminance signal is employed for such control. An advantage of this method over a peaking approach to picture sharpness enhancement is the avoidance of blooming of peaked white picture elements.

It is known in the prior art to apply a differentiated video signal to the input of a double ended limiter incorporating a pair of threshold circuits. The limiter consists of two separate differential amplifiers, where each amplifier is separately biased to provide double ended limiting as well as to provide coring. The limiter arrangement develops a doubly clipped signal output which does not respond to excursions of the differentiated signal which lie below selected threshold magnitudes. Thus the gain of the limiter is such as to provide sharpness enhancement for slow transients while precluding excessive supplemental beam deflection with fast transients. The coring capability of the limiter arrangement significantly lessens the likelihood of noise visibility.

It may be desirable, however, to use a single differential amplifier stage, followed by another stage which will provide the coring function. In such an arrangement, it may be easier to design cost effective circuitry that still meets the requirements of a flat group delay response.

As indicated above, in order to provide beam scan velocity modulation, one differentiates the video signal. A differentiator has an increasing output with increasing frequency. Thus, if the input video signal has higher than normal high frequency components, then a linear system would deliver higher than normal output current and dissipate higher than normal power in the output stage. In such a prior art system, it is possible to overdissipate the output stages of the beam scan velocity modulation system by responding to a particular video signals with much high frequency content.

Circuits are known in the prior art which, in addition to providing signal limiting, reduce power dissipation in the output stages. In such circuits, the current flowing in the output power amplifier is detected to provide a control signal used to control the gain of a preamplifier in a preceding stage. This action suppresses the increase of power dissipation in the output power amplifier when a video signal of a certain frequency characteristic is received. No coring of the differentiated signal is provided, and hence there is exhibited inferior operation in the presence of noise. Furthermore, since the feedback reduces the signal gain as a function of output power, overall SVM operation is reduced, tending to produce a less pleasing visual effect.

Still other circuits are known which operate in a different manner to limit power dissipated in the SVM output stages. In these circuits parallel resistor capacitor combinations with long time constants are provided. These RC combinations are in series with emitter electrodes of transistors which are employed in the output power amplifiers of the SVM system. The transistors operate in a Class B mode with the top transistor conducting on one half cycle of its input waveform and with the bottom device conducting on the other half cycle.

Using this scheme, the bias of the base emitter junction becomes a function of the average amount of high frequency detail in the television image and thereby undesirably introduces more or less output stage coring of the signal depending upon the scene information. Furthermore, this approach requires relatively large magnitude, high voltage capacitors which are expensive and bulky.

As an example, the capacitors used may be 47 $\mu$f in value and the resistors 20 ohms in value. The voltage requirements on the capacitors may be in excess of 150 volts. Hence, these capacitors are quite large, bulky and expensive.

SUMMARY OF THE INVENTION

In accordance with an inventive arrangement, a first amplifier is responsive to an input video signal and provides peak-to-peak limiting. A driver amplifier receives the limited signal via a buffer amplifier and provides noise coring subsequent to limiting. An output amplifier coupled to the driver amplifier energizes a scan velocity modulation circuit in accordance with the limited and noise cored video signal.

In accordance with another inventive arrangement, a scan velocity modulation circuit includes means for monitoring the current in the output stage of the SVM circuit and controlling the operation of a preceding stage differential amplifier in accordance with the monitored current. Advantageously, this can prevent overdissipation in the output stage.

DETAILED DESCRIPTION

Figure 1:
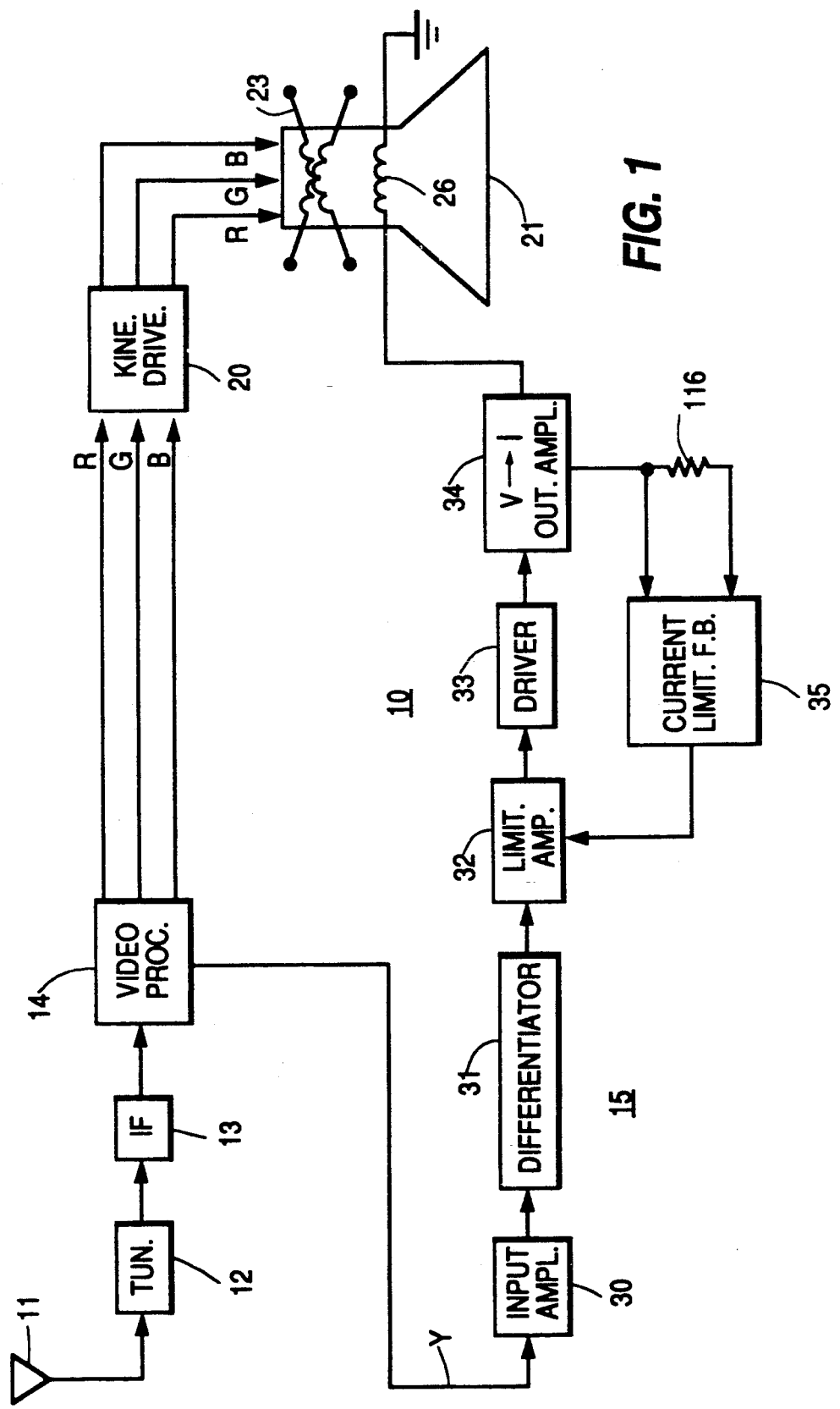
FIG. 1 is a block diagram of a color television receiver employing a beam scan velocity modulation system, embodying the invention.

Referring to FIG. 1 there is shown a block diagram of a color television receiver 10, with beam scan velocity modulation. A television antenna 11 is conventionally coupled to a tuner 12. The output of the tuner is applied to an IF stage 13. The baseband composite color output of IF stage 13 is coupled to a video processor 14. Video processor 14 separates the luminance and chrominance components, demodulates the chrominance into color difference signals, and combines the luminance and color difference signals to generate R, G, B output signals. The R, G, B output signals are applied to a kinescope driver circuit 20, which circuit drives the kinescope 21 associated with a conventional color television receiver.

Associated with kinescope 21 is a main deflection yoke 23 comprising respective horizontal and vertical deflection windings, each of which are subjected to energization by respective horizontal and vertical deflection circuits (not illustrated) to develop a raster of scanning lines on the viewing screen of kinescope 21. Supplemental deflection of the respective beams is supplied by an auxiliary deflection coil 26 which operates to provide scan velocity modulation. Coil 26 may be a single coil or a coil having multiple windings.

Energization of SVM coil 26 is provided by a scan velocity modulation circuit, SVM 15, embodying the invention. A luminance video signal Y is generated by video processor 14 and is applied to the input of an amplifier 30 of SVM 15. The output of amplifier 30 is coupled to the input of a differentiator circuit 31 whereby the amplified video signal is differentiated. The video or image representative signal as amplified and differentiated is then applied to the input of a limiting amplifier 32. As will be explained with reference to FIG. 2, limiting amplifier 32 is a single differential amplifier including differentially coupled transistors 51 and 52, and a controllable constant current source 17. The amplifier operates to limit the differentiated video signal both in the positive and negative direction. The output of limiting amplifier 32 is applied to the input of a driver amplifier 33, which includes a coring function. The output of driver 33 is coupled to the input of an output power amplifier stage 34 for converting the applied voltage to an output current. This current is related to the differentiated video signal and is used to drive scan velocity modulation coil 26.

As one may appreciate, the output of the SVM circuitry directly affects the visual image. The circuitry therefore has to have a bandwidth and a group delay characteristic which match that of the video circuitry feeding kinescope 21.

As indicated, differentiator 31 has increasing output with increasing frequency. If the video signal consists of a signal with higher than normal high frequency components, then an SVM circuit will tend to deliver higher than normal output current via output amplifier 34 and therefore the output amplifier would tend to dissipate higher than normal power. It is therefore possible to overdissipate the output stage and damage the output transistors simply by having the circuit respond to a particular video signal.

An advantageous aspect of the invention is an SVM circuit which operates to prevent overdissipation of the output amplifier stage. As shown in FIG. 1, there is a stage 35 which provides current limiting feedback. The circuit to be described in detail develops a control signal from the current monitored in a current sampling resistor 116, which is related to the average current flowing through output amplifier stage 34. The control signal is applied to a controllable current source associated with the differential amplifier portion of limiting amplifier 32. In this manner, when the differentiated input video signal has much signal content, the control voltage operates to reduce the peak-to-peak signal output from the limiting amplifier by affecting the amount of emitter current that flows through the limiting amplifier. In this way, the limiting levels in the limiting amplifier are controlled by the current through the current source. This operation is a closed loop operation and serves to limit the maximum average current allowed to flow in the output devices incorporated in output stage 34.

As an advantageous configuration, the limiting amplifier is a differential amplifier including a variable constant current source such as a transistor, where the base electrode of the transistor receives the control signal to control the current according to the average current flowing in the output stage. The limiting amplifier limits the differentiated video signal for both positive and negative excursions above given thresholds. When the current in the output amplifier stage exceeds a given value, the current source as controlled by the current feedback reduces the peak-to-peak output of the differential limiting amplifier.

In order to achieve optimum operation, coring advantageously is then performed in a separate stage after the limiting amplifier stage and before the output amplifier stage. Hence coring is unaffected by the closed loop operation as described.

Figure 2:
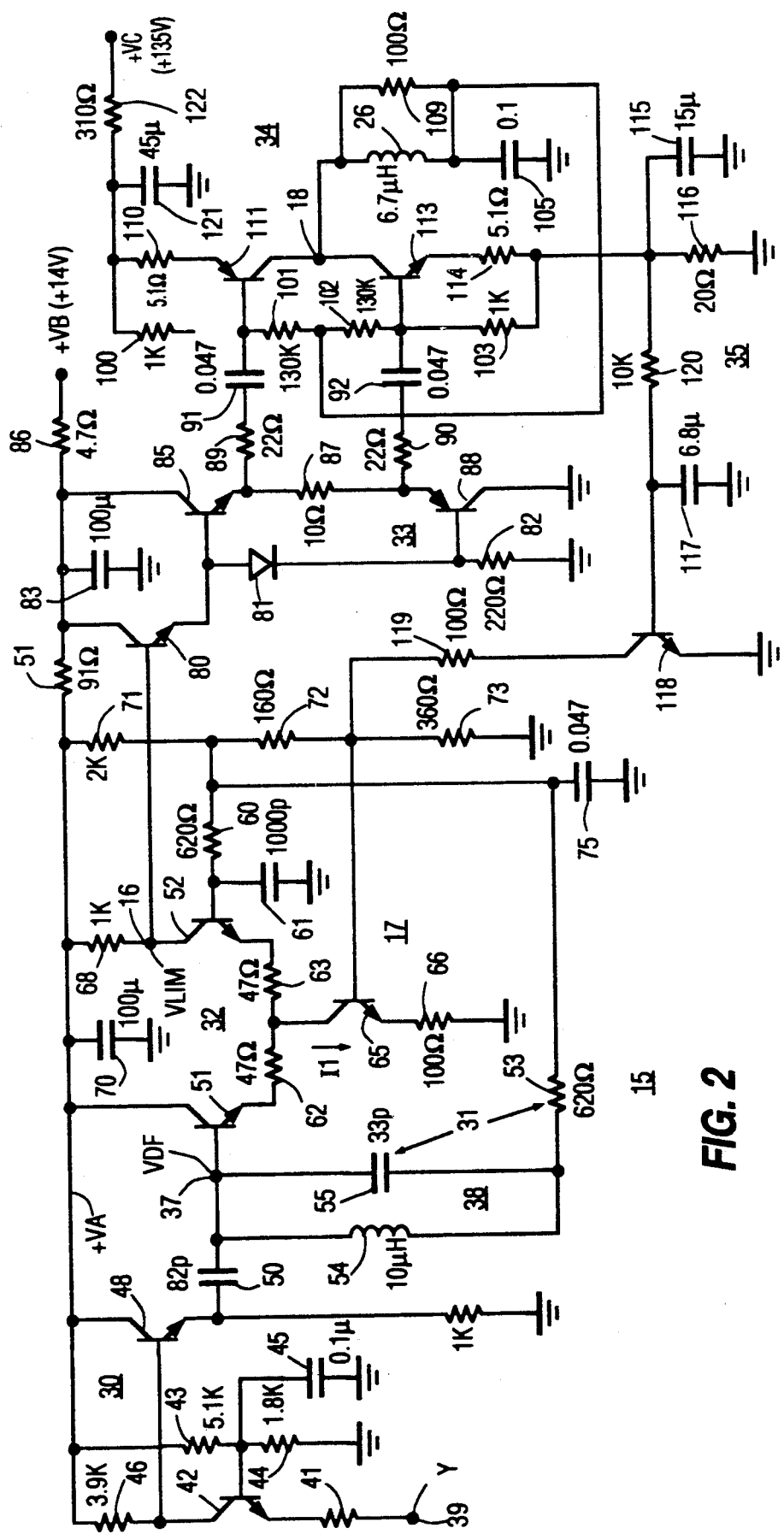
FIG. 2 is a more detailed circuit diagram of the beam scan velocity modulation system of FIG. 1.

Referring to FIG. 2 there is shown a detailed circuit schematic of scan velocity modulation circuit 15, embodying inventive aspects. In addition to employing reference alphanumerics in FIG. 2, component values are also given.

Figure 3:
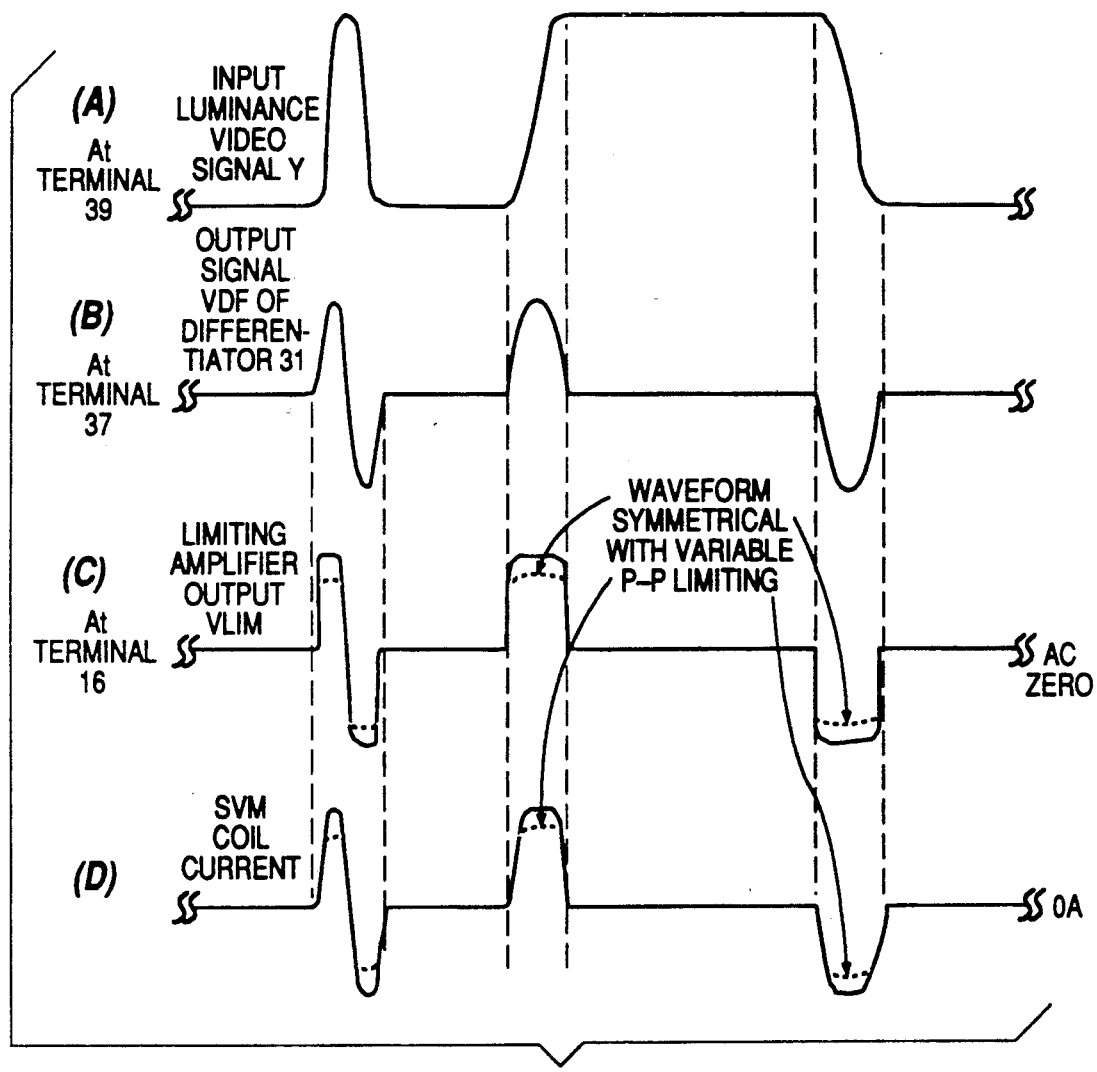
FIG. 3(A)–3(D) is a series of waveforms useful in explaining the operation of the circuitry depicted in FIG. 2.

In FIG. 2, luminance video signal Y of FIG. 1 is coupled to a video input terminal 39 of SVM 15. An illustrative input luminance video signal Y is shown in FIG. 3A. This signal is a video signal manifesting a sine-squared pulse and bar input signal.

Video signal Y is applied to input amplifier stage 30 via a resistor 41. Resistor 41 is coupled to the emitter electrode of a transistor 42 arranged in a common base configuration. Biasing for the common base transistor is obtained by a voltage divider consisting of resistors 43 and 44 in series between a source of operating potential +VA and ground.

A bypass capacitor 45 is coupled to the base electrode of transistor 42. Operating potential +VA is obtained from a source of +12 V DC voltage, +VB, and is filtered from the effects of other loads coupled to the +VB source by a resistor 51 and a capacitor 70.

The collector electrode of transistor 42 is directed through a load resistor 46 to the source of operating potential +VA. The collector electrode of transistor 42 is also coupled directly to the base electrode of a transistor 48 arranged in an emitter follower configuration. The collector electrode of transistor 48 is coupled to the source of operating potential +VA. The emitter electrode of transistor 48 is directed to ground through a resistor 49. The emitter electrode is further coupled via a capacitor 50 to the base electrode of a transistor 51. Transistor 51 and a transistor 52 comprise differential limiting amplifier 32, according to an aspect of the invention.

A differentiator 31 comprising a capacitor 55 and a resistor 53 is coupled to the output emitter of emitter follower transistor 48 and to the base of transistor 51. Resistor 53 has one terminal coupled to a terminal of a tank circuit 38 and another terminal coupled to the junction between resistors 71 and 72 of a voltage divider comprising resistors 71, 72 and 73, which, as will be explained, serves to bias the differential limiting amplifier.

Tank circuit 38 comprises an inductor 54 in shunt with capacitor 55. The tank circuit operates to provide a flattened group delay in regard to the differentiator operation in order to provide compensation for the high frequency response of the differentiator. Tank circuit, thus, improves the linearization of the differentiator output with regard to high frequency operation. The base electrode of transistor 51 receives the differentiated video signal VDF at a differential amplifier input terminal 37, the differentiated signal being shown in FIG. 3(B).

The emitter electrode of transistor 51 is coupled via a gain degenerating resistor 62 to the collector electrode of a transistor 65. Transistor 65 is part of a controllable current source 17 that includes transistor 65 in series with a resistor 66.

In a similar manner, transistor 52 has its emitter electrode coupled to the collector electrode of current source transistor 65 via a gain degenerating resistor 63. Resistor 62 and 63 are equal in magnitude. The collector electrode of transistor 52 is coupled to the point of operating potentia; +VA via a collector load resistor 68. The collector electrode of transistor 52 comprises an output terminal 16 of limiting amplifier 32. The limited SVM signal VLIM at terminal 16 is illustrated in FIG. 3(C).

DC biasing for the differential amplifier is obtained via resistors 71, 72 and 73 forming a voltage divider between the source of operating potential +VA and ground. The base electrode of transistor 52 is coupled to the junction of resistors 71 and 72 via a resistor 60. The base electrode of transistor 52 is coupled to ground via a capacitor 61 which operates as a bypass for high frequency signal components. DC biasing for transistor 51 is obtained by connecting one terminal of resistor 53 to the junction between resistors 71 and 72 and the other terminal to shunt tank circuit 38, with inductor 54 acting as a DC short-circuit. Resistor 60 and resistor 53 are relatively of the same magnitude to assure that transistors 51 and 52 are equally biased at their bases.

The current through the differential amplifier is determined by variable current source 17. The base electrode of transistor 65 of current source 17 is directed to the junction between resistors 72 and 73 of the voltage divider and, as will be explained, is also connected to the collector electrode of a control transistor 118 via a resistor 119 for controlling the current in the limiting stage. This control transistor affects the peak-to-peak output signal of the limiting stage, as will be further explained.

Differential limiter 32 provides double ended limiting. FIG. 3C depicts the output at the collector electrode of transistor 52, and as seen, is a waveform having a limited peak-to-peak value. The clipping level in the differential pair comprising transistors 51 and 52 is a function of the current in current source 17. The dashed line indication in FIG. 3(C), as will be explained, is the control afforded by controllable current source 17.

The collector electrode of transistor 52 is directly connected to the base electrode of an emitter follower transistor 80. The collector electrode of transistor 80 is coupled to a source of operation potential +VB. Operating potential +VB is filtered by a resistor 86 and a capacitor 83. The output emitter electrode of transistor 80 is coupled to a driver stage 33 which provides noise coring, as will be further explained. Advantageously emitter follower transistor 80 serves as a buffer amplifier between the limiter stage 32 and the driver stage 33.

Driver stage 33 comprises an NPN transistor 85 and a complementary type PNP transistor 88, with the base of transistor 85 being directly coupled to the emitter of transistor the base of transistor 88 being coupled to the emitter of transistor 80 via a diode 81. Diode 81 is directly coupled between the bases of the two driver transistors. A resistor 87 is coupled between the emitters of transistors 85 and 88, and a resistor 82 is coupled between the base of transistor 88 and ground.

Transistors 85 and 88 form a Class B amplifier which operates to drive output stage 34. The Class B amplifier also provides a low level noise coring function.

The emitter electrodes of transistors 85 and 88 in Class B driver stage 33 are AC coupled to the respective base electrodes of complementary type transistors 111 and 113 in output stage 34. The emitter electrodes of transistors 85 and 88 are AC coupled through respective resistors 89 and 90 in series with respective capacitors 91 and 92. The emitter electrode of transistor 111 is directed through a resistor 110 to a source of operating potential +VC via a resistor 122. A DC supply filter capacitor 121 is coupled to the junction of resistors 122 and 100. The source of potential +VC is a DC source of relatively high magnitude as, for example, 135 volts, as compared to the source of potential +VB, which is about 14 volts. This enables output amplifier stage 34 to drive high frequency current through SVM coil 26.

The collector electrode of transistor 111 is coupled to one terminal of scan velocity modulation coil 26. The collector electrode of transistor 111 is also coupled to the collector electrode of transistor 113, thereby forming a Class B output stage having an output terminal 18 at the junction of the collector electrodes. The emitter electrode of transistor 113 is coupled via a resistor 114 and a current monitoring or sampling resistor 116 to ground. Resistor 116 is shunted by means of a filter capacitor 115. The average current through output stage 34, including transistors 111 and 113, flows through resistor 116.

Biasing for the output stage is obtained from a voltage divider comprising of resistors 100, 101, 102, and 103, with the base electrode of transistor 111 coupled to the junction of resistors 100 and 101, and with the base electrode of transistor 113 coupled to the junction of resistors 102 and 103.

One end of SVM coil 26 is coupled to output terminal 18, and the other end is coupled to a grounded capacitor 105. In this manner, the SVM coil is AC coupled to the output amplifier, and no DC current flows in the coil. A damping resistor 109 is coupled across SVM coil 26. DC stabilization is provided by coupling the junction of SVM coil 26 and capacitor 105 to the junction of resistors 101 and 102.

Advantageously, noise coring is provided subsequent to differential amplifier limiting stage 32, in both driver stage 33 and amplifier output stage 34.

Consider first the coring operation provided by driver stage 33. DC blocking capacitors 91 and 92 prevent the DC voltages established at the base electrodes of output stage transistors 111 and 113 from being passed back to the emitter electrodes of driver stage transistors 85 and 88. Since the signals out of limiter stage 32 are symmetrical in both amplitude and duration, the average value of the DC voltage at the bases and emitters of transistors 85 and 88 are constant during operation. Due to the bias introduced by diode 81, the DC voltage at the base of transistor 88 is one diode drop less than the voltage at the base of transistor 85. Under normal small signal operation, the DC voltage drop across resistor 87 is very small making the voltages of the emitters of transistors 85 and 88 to be approximately equal. Under these conditions, the average value of the base-emitter voltage for transistors 85 and 88 is one half of the diode drop of diode 81. Absent a signal, this is insufficient to cause transistors 85 and 88 to conduct. These transistors will start to conduct only when the peak-to-peak signal at the emitter of transistor 80 exceeds one diode drop, thus providing a coring offset level. As an example, if the peak-to-peak signal swing at the emitter of transistor 80 is 10 volts and the diode voltage and transistor threshold voltages are 0.7 volts then the percent coring for this stage would be (0.7/10) times 100 or 7 percent. In actuality due to the nonlinearity of the voltage versus current characteristics of a junction, the coring is slightly lower.

Now consider the coring operation provided by amplifier output stage 34. With the condition that the voltage drop across resistor 116 is small with respect to +VC (135 volts), the DC bias for the base-emitter junctions of transistors 111 and 113 are determined by the voltage VC and the voltage divider comprising resistors 100, 101, 102 and 103. These values are selected such that with no signal applied, transistors 111 and 113 are off, with a bias value of Vbias. With a signal applied which is symmetrical in amplitude and duration, these transistors will conduct when the peak signal exceeds the junction threshold (approximately 0.6 volts) less Vbias. This action results in the coring of the signal. As an example, if the peak input signal is 5 volts, Vbias=0.4 volts and the base to emitter threshold voltage of the transistors is 0.6 volts, then the percent coring of the signal would be (0.6−0.4)/5 times 100 or 4 percent.

To limit power dissipation in amplifier output stage 34, a current feedback circuit 35 is coupled between the output stage and controllable current source 17 of differential limiter amplifier stage 32. Current feedback circuit 35 includes sampling resistor 116, filter capacitor 115 in parallel with resistor 116 and the inverting feedback transistor 118, having an input base electrode coupled to sampling resistor 116 via a resistor 120 and having an output collector electrode coupled via resistor 119 to the base of transistor 65, at the junction of voltage dividing resistors 72 and 73. A bypass capacitor 117 is coupled to the base of transistor 118.

The limiter operation of the circuit of FIG. 2 is generally as follows. The clipping levels in limiting amplifier 32 are controlled by the current through controllable current source 17. The current in controllable current source 17 is controlled by the base voltage of transistor 65, which, in turn, by operation of feedback circuit 35, is dependent on the average power or current in output stage 34. The DC path for current from the +VC supply is through transistors 111, 113, and sampling resistor 116. The filtered voltage across resistor 116 is thus a measure of the average current through the output devices. Capacitor 115 in conjunction with resistor 116 provides a filtering time constant of several hundred horizontal line periods, and feedback circuit 35 is relatively unresponsive to current variations at the horizontal rate. Bypass capacitor 117, by being directly coupled to the base electrode of transistor 118, provides further assurance that feedback circuit 35 remains unresponsive to high frequency signals and noise.

The value of resistor 116 is selected such that when the input video signal has substantial high frequency content, the resulting voltage across resistor 116 causes transistor 118 to conduct. When transistor 118 conducts, base current is shunted away from transistor 65, reducing its conduction. The magnitude of current source 17 is reduced, thereby reducing the peak-to-peak signal output from limiting amplifier 32. This is shown in FIG. 3(C) by comparing the solid-line limited waveform without variable limiting to the dashed line waveform with variable limiting.

The clipping levels in the limiting amplifier are controlled by the current I1 in transistor 65, which in turn is controlled by the base voltage of transistor 65.

Figure 4:
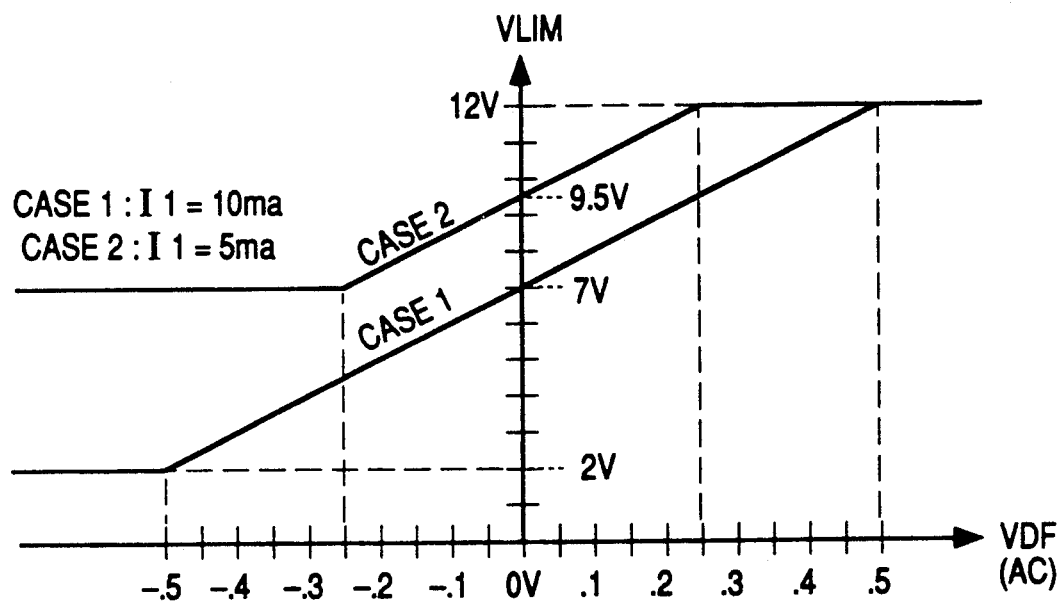
FIG. 4 is a graph useful in explaining operation of the limiting amplifier in FIG. 3.

FIG. 4 shows the limiting conditions for a current I1 of 10 milliamperes, designated as Case 1 and 5 milliamperes, designated as Case 2. In Case 1, a current I1 of 10 milliamperes represents a situation of relatively little high frequency video content and thus relatively low average current through output stage 34 of FIG. 2. In this situation, transistor 118 is cut off and current source transistor 65 is most conductive. In Case 2, a current I1 of 5 milliamperes represents a situation of relatively much high frequency video content and thus relatively high average current through output stage 34. In this situation, transistor 118 is most conductive and current source transistor 65 is least conductive.

As one can see from FIG. 4, VLIM, when limiting in the positive direction, in both cases equals 12 volts, which is the output voltage level when transistor 52 is non-conducting and resistor 68 is pulled up to the +VA supply rail. This occurs in Case 2 for a differentiated input signal VDF of +0.25 volts above its DC level and in Case 1 for an input signal of +0.5 volts. When limiting in the negative direction, when transistor 52 is most conductive, then in Case 1, an output voltage VLIM of +2 volts is provided for an input signal of −0.5 volts, and in Case 2, an output voltage of +7.0 volts is provided for an input signal of −0.25 volts.

Thus, there is a change in the peak-to-peak clipping levels depending upon the current I1 flowing in current source transistor 65. In Case 1 for an input signal VDF having a peak-to-peak value of 1 volt or more, the differential amplifier will produce an output signal having a peak-to-peak value limited to 10 volts. In Case 2 for an input signal VDF having a peak-to-peak value of 0.5 volts or more, the amplifier will produce an output peak-to-peak value limited to 5 volts.

Figure 5:
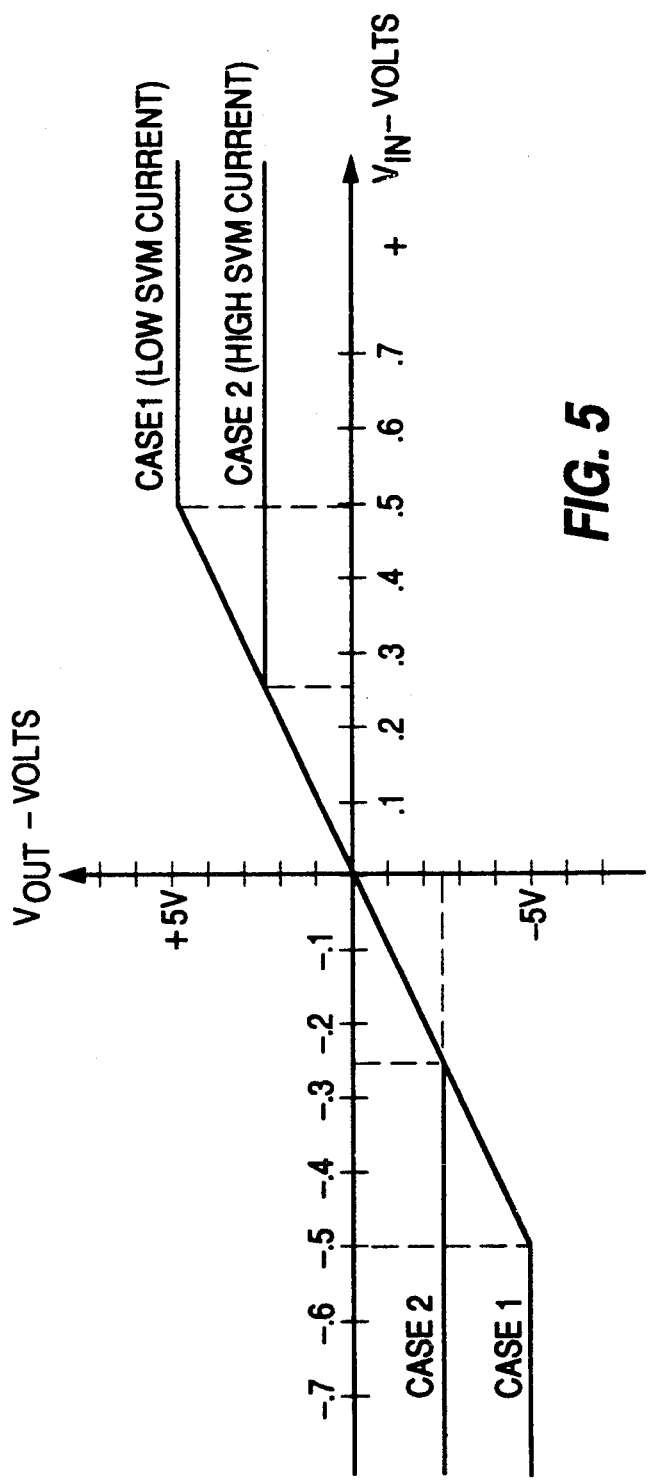
FIG. 5 is another graph useful in explaining operation of the limiting amplifier.

Limiting amplifier stage 32 is DC coupled, via emitter-follower transistor 80 to the Class B operating transistors 85 and 88 of driver stage 33. The output of driver stage 33 is then, however, AC coupled to the output stage 34. Hence FIG. 5 illustrates the two cases of FIG. 4 based on AC coupling to the output driver stages. In other words, FIG. 5 shows the effect of removing the DC component from the voltage VLIM. Thus as one can ascertain from FIG. 4 and FIG. 5, the peak-to-peak or AC clipped level is solely a function of the amount of current flowing in controllable constant current source 17 as controlled by output current feedback circuit 35.

Using the differential limiting amplifier stage 32 embodying an aspect of the invention, variable and AC symmetrical limiting is achieved. The peak-to-peak differentiated output signal is reduced under high average currents. At the same time, the amplitude of the peak-to-peak differentiated input signal VDF necessary to reach the limiting point is also reduced.

As a further advantage, the small signal gain of differential limiting amplifier stage 32 is relatively unchanged by the variable limiting introduced by feedback circuit 35 of FIG. 2. Thus, as idealized in the illustration of FIG. 5, prior to their respective limiting points, the output versus input curves for Cases 1 and 2 have the same slope. This enables the coring action performed in the succeeding driver stage 33 on short duration, low amplitude input signals to remain unaffected by the feedback operation during high average output stage current levels.

What is claimed is:

1. Apparatus, comprising:
   a source of an input video signal;
   a first amplifier responsive to said input video signal for providing peak-to-peak limiting thereof at an output of said amplifier;
   a buffer amplifier having an input coupled to the output of said first amplifier;
   a driver amplifier receiving from said buffer amplifier the peak-to-peak limited video signal for providing noise coring subsequent to said limiting;
   means for velocity modulating scanning of an electron beam in a kinescope; and
   an output amplifier coupled to said driver amplifier and to said velocity modulating means for energizing said velocity modulating means in accordance with the limited and noise cored video signal.

2. Apparatus, according to claim 1, including means coupled to said first amplifier and responsive to main current in said output amplifier for varying said peak-to-peak limiting in accordance with said main current.

3. Apparatus, according to claim 2, wherein the level of said noise coring does not significantly vary with variation of said peak-to-peak limiting.

4. Apparatus, according to claim 2, wherein the signal gain of said first amplifier prior to said limiting remains substantially unchanged with said variation of peak-to-peak limiting.

5. Apparatus, according to claim 4, wherein the level of said noise coring remains substantially unchanged with said variation of peak-to-peak limiting.

6. Apparatus, according to claim 2, wherein said output of said first amplifier is located at a collector electrode of one of two differentially coupled transistors and including a variable current source coupled to said varying means and providing a variable main current for the two transistors in accordance with the main current in said output amplifier.

7. Apparatus, according to claim 6, wherein the level of said noise coring remains substantially unchanged with said variation of peak-to-peak limiting.

8. Apparatus, according to claim 6, wherein said output amplifier comprises two complementary output transistors coupled via a DC blocking capacitance arrangement to said driver amplifier.

9. Apparatus, according to claim 8, wherein said driver amplifier comprises two complementary driver transistor having their output emitter electrodes coupled via said DC blocking capacitance arrangement to respective base electrodes of the two output transistors.

10. Apparatus, according to claim 1, wherein said output of said first amplifier is located at a collector electrode of one of two differentially coupled transistors and further including a current source coupled to a junction of the emitter electrodes of the two transistors for providing main current in said first amplifier.

11. Apparatus, comprising:
   a video signal processing means for noise coring and symmetrically limiting a video signal;
   means for scanning beam velocity modulation in accordance with said noise cored and symmetrically limited video signal; and,
   means operable in accordance with said scanning beam velocity modulation means for varying at least one of said limiting and said noise coring in said video signal processing means to reduce dissipation in said scanning beam velocity modulation means.

12. Apparatus, according to claim 11, wherein said video signal processing means comprises a limiter responsive to a control signal developed in said scanning beam velocity modulating means.

13. Apparatus, according to claim 12, wherein said video signal processing means comprises noise coring means.

14. Apparatus, according to claim 11, wherein said symmetrical limiting means comprises a differential amplifier.

15. Apparatus, according to claim 11, wherein said symmetrical limiting means comprises a differential amplifier with a current source responsive to said control signal.

16. Scan velocity modulating apparatus, comprising:
   a source of an input video signal;
   a differential amplifier responsive to said input video signal for providing a peak to peak limited output signal, said amplifier including first and second transistor differentially coupled to each other at their emitter electrodes via a gain degenerating impedance;
   a current source arrangement controllable in amplitude coupled to said emitter electrodes for controlling the amplitude of said limited signal;
   means for velocity modulating scanning of an electron beam in a kinescope;
   an output amplifier responsive to said limited signal for energizing said velocity modulating means; and
   a source of a variable control signal coupled to said current source arrangement for controlling the amplitude of said limited signal in accordance with said control signal.

17. Apparatus according to claim 16, wherein prior to limiting, the signal gain of said differential amplifier is established by said gain degenerating impedance and remains substantially unchanged with variation of said control signal.

18. Apparatus according to claim 16, wherein said current source is coupled to said output amplifier for generating said variable control signal in accordance with operation of said output amplifier.

19. Apparatus according to claim 16, further including a driver amplifier interposed between said differential amplifier and said output amplifier and in which noise coring of said limited signal is performed.

20. Apparatus according to claim 19, wherein said driver amplifier comprises first and second transistors coupled together in a push-pull configuration with their base electrodes receiving said limited signal and coupled to each other to establish a voltage offset for performing said noise coring.

21. Apparatus according to claim 20, wherein the base electrodes of the two push-pull configured transistors are coupled together via a diode.

22. Apparatus according to claim 19, wherein the signal gain of said differential amplifier prior to limiting, as established by said gain degenerating impedance, remains substantially unchanged with variation of said control signal.

23. Scan velocity modulating apparatus, comprising:
a source of an input video signal;
a differential amplifier responsive to said input video signal for providing a peak to peak limited output signal, said amplifier including first and second transistors differentially coupled to each other at their emitter electrodes;
means for velocity modulating scanning of an electron beam in a kinescope;
an output amplifier responsive to said limited signal for energizing said velocity modulating means;
means interposed between said differential amplifier and said velocity modulating means for noise coring said limited signal; and
means coupled to said differential amplifier for degenerating the gain of said differential amplifier before limiting is reached to enable the noise coring means to operate on a gain degenerated signal.

24. Apparatus according to claim 23 wherein said gain degenerating means comprises first and second resistors coupled to respective emitter electrodes of said first and second transistors and coupled to a differential amplifier current source at a junction of the two resistors.

* * * * *